United States Patent [19]
Allard et al.

[11] Patent Number: 5,561,705
[45] Date of Patent: Oct. 1, 1996

[54] APPARATUS FOR AUTO DIALING TELEPHONE NUMBERS AND DTMF TONES IN A PERSONAL COMMUNICATION DEVICE

[75] Inventors: David J. Allard, Boyton Beach; Peter R. Eastwood, Delray Beach; Julie F. Goodwin, Boca Raton; James R. Lewis, Coconut Creek; David J. Rasmussen, Boca Raton, all of Fla.

[73] Assignee: International Business Machines Corporation, Armonk, N.Y.

[21] Appl. No.: 279,652

[22] Filed: Jul. 25, 1994

[51] Int. Cl.⁶ .................................................. H04Q 7/32
[52] U.S. Cl. ........................ 379/58; 379/354; 379/355
[58] Field of Search ...................... 379/58, 59, 354–356

[56] References Cited

U.S. PATENT DOCUMENTS

| | | |
|---|---|---|
| Re. 34,034 | 8/1992 | O'Sullivan . |
| 4,697,281 | 9/1987 | O'Sullivan . |
| 4,837,800 | 6/1989 | Freeburg et al. . |
| 4,964,156 | 10/1990 | Blair ......................................... 379/355 |
| 4,972,457 | 11/1990 | O'Sullivan . |
| 4,980,910 | 12/1990 | Oba et al. ............................... 379/354 |
| 5,127,041 | 6/1992 | O'Sullivan . |
| 5,257,397 | 10/1993 | Barzegar et al. . |
| 5,263,078 | 11/1993 | Takahashi et al. . |
| 5,276,729 | 1/1994 | Higuchi et al. .......................... 379/356 |
| 5,282,238 | 1/1994 | Berland . |

*Primary Examiner*—Dwayne D. Bost
*Attorney, Agent, or Firm*—Pollock, Vande Sande & Priddy

[57] ABSTRACT

A radio telephone which communicates via cellular telephone networks and by direct connection to a PSTN. The radio telephone includes a random access memory for storing a character string comprising dialing digits defining a calling number and DTMF digits representing signalling tones for accessing information to called equipment. The character string includes a delimiting character for separating dialed digits and DTMF digits. In a dialing sequence, the cellular radio will dial numbers defined by the dial digits and send the remaining characters as DTMF tones to connected telephone.

8 Claims, 5 Drawing Sheets

APPARATUS FOR AUTO DIALING TELEPHONE NUMBERS AND DTMF TONES IN A PERSONAL COMMUNICATION DEVICE

RELATED APPLICATIONS

This application is related to the following patent applications:

(1) Attorney Docket No. BC994-050 is Ser. No. 08/310,728, filed Sep. 22, 1994;

(2) Attorney Docket No. BC994-096 is Ser. No. 08/279,640, filed Jul. 25, 1994;

(3) Attorney Docket No. BC994-099 is Ser. No. 08/179,644, filed Jul. 25, 1994;

(4) Attorney Docket No. BC994-097 is Ser. No. 08/279,413, filed Jul. 25, 1994; and, (5) Attorney Docket No. BC994-101 is Ser. No. 08/279,659, filed Jul. 25, 1994.

1. Field of the Invention

The present invention relates to personal communication devices which communicate over both cellular radio networks and public switched networks (PSTN). More particularly, the invention provides for autodialing and DTMF signalling over the cellular radio network or PSTN network.

2. Background of the Invention

Cellular radio service is now widespread throughout most of the United States. Standards have been promulgated to permit universal access to the cellular telephone network by portable telephones and mobile telephones. The communication protocol standard used in the cellular network is identified as the AMPS protocol. The service permits radio telephone communication between portable/mobile units, and the public switched telephone network (PSTN) through a radio interface.

The cellular service is now digitized and permits not only digital telephone traffic but data services as well. Thus, various services which have been implemented in the PSTN network, such as E-MAIL and facsimile, may now be implemented as well over the cellular telephone network. A radio modem is implemented at each personal communication device which provides for the capability of transmitting and receiving data on the transmitted carrier signal.

The public switched network supports various user services such as accessing equipment through the use of a personal information number (PIN). Using DTMF signalling, a caller who places a call to a bank or to his home or office message recording equipment, can access the equipment by inserting his PIN number via DTMF tones from the telephone keypad. Dialing equipment exists for entering not only the number of the called party supporting such equipment, but also the PIN information as DTMF signalling tones following the dialing digits. As the PSTN network employs DTMF signals for placing a call as well as for transmitting a PIN number, such information may be sent as a single character string, with separating pauses between the dialing digits and PIN number.

The same type of service is also desirable over cellular telephone networks which communicate with personal communication devices. However, the protocol used in the cellular communication network presents an obstacle in forming character strings which include dial digits as well as DTMF signalling information. As the AMP cellular radio service does not use the DTMF signalling tones for placing a call, the DTMF command signals for accessing the called party's equipment cannot be sent as a single string with the dial digits.

In view of these difficulties, the present invention has been provided.

SUMMARY OF THE INVENTION

It is an object of this invention to provide compatible signalling in a personal communications device which supports cellular telephone communications as well as communications over the PSTN network.

It is a more specific object of this invention to combine in a single string of characters a dial command and a DTMF signalling command for a cellular telephone system.

It is a more specific object of this invention to provide a system for delimiting dialing digits and DTMF signalling digits in a string of characters for processing by a cellular telephone.

These and other objects of the invention are provided for by an apparatus used in a personal communications device. A personal communication device supports telephone and data traffic via a cellular telephone network as well as through a direct connection to the PSTN network at the option of the user. When placing calls with the personal communication device which include DTMF signalling commands for accessing the called party's equipment, a single character string of digits is formed. The single string of digits includes the dialing digits for placing the call as well as the DTMF signalling digits to be sent over the connection representing personal information or commands relating to the personal information.

The single character string is delimited between those digits which comprise the called party's dialed digits and the remaining digits representing a DTMF command with a delimiting character. The delimiting character may be a comma placed in the string of characters by the user delimiting dial digits from DTMF commands. A processor executes a command to place a telephone call over the cellular telephone by individually reading out each digit and marking the first comma in the string with a null character. The cellular telephone treats each character preceding the null character as a digit of the called party's telephone number.

Additional commas following the first null digit indicate a delay following which DTMF digits are transmitted. Thus, the cellular telephone, after detecting the null digit, will wait a period of time represented by the number of commas in the string before commencing DTMF signalling using the remaining digits.

Before forwarding the string of characters to the cellular telephone, the system checks to determine whether the cellular telephone is already in use. If so, the entire string of characters is sent as a DTMF command to the cellular telephone network.

DESCRIPTION OF THE PREFERRED EMBODIMENT

Figure 1A:
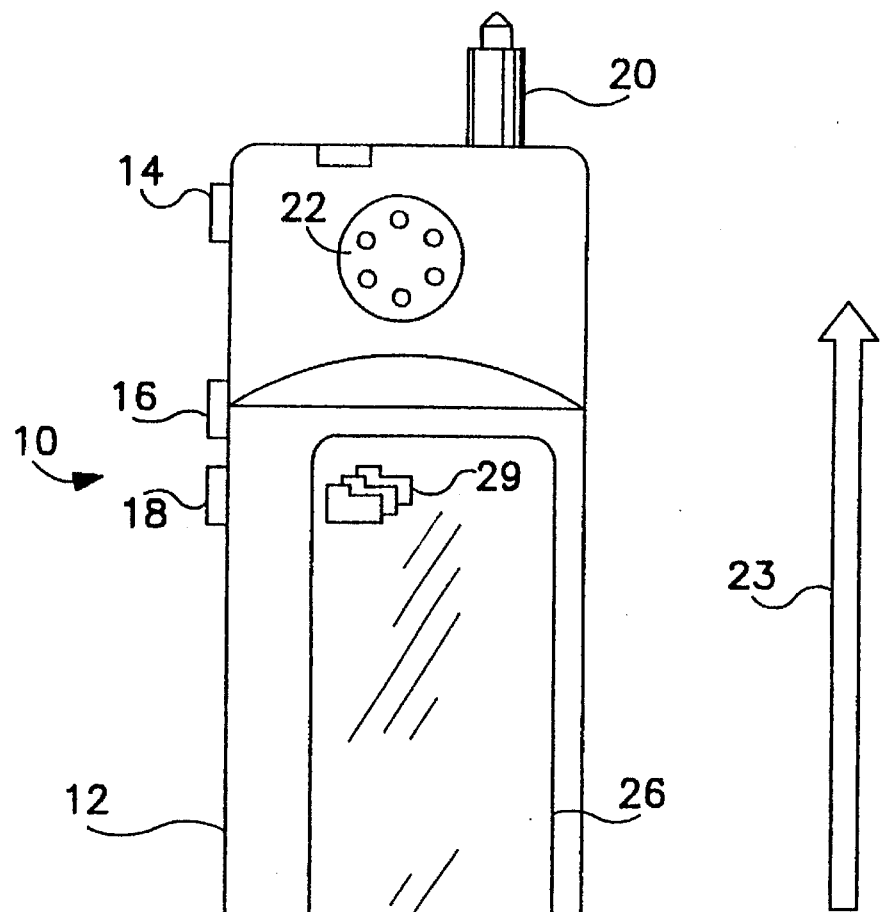
FIG. 1A is a plan view of a personal communication device employing a preferred embodiment of the present invention.

Referring now to FIG. 1A, there is shown a personal communication device 10. The personal communication device includes a cellular telephone and an internal data processing system for implementing, via cellular radio, multiple data communication features, such as E-MAIL, facsimile transmission/reception, etc. The personal communicator 10 includes a housing 12 which has pushbuttons 14, 16 and 18 mounted along lateral sides thereof. Manual pushbuttons 14, 16 and 18 provide for on/off, up (increase) and down (decrease) functions.

The personal communication device 10 includes a speaker 22 and microphone 24 positioned at approximately the standard telephone handset positions. In use, the cellular telephone communicates through antenna 20 to provide normal two-way voice communication between the user and a base station connected to the PSTN network.

Input/output functions to the processor within the personal communications device 10 are effected through the touch-sensitive screen 28, and underlying touch screen display 26. The touch screen display 26 displays various menus familiar to computer users, and various selection icons. By using a small pointed stylus 23, it is possible to select among menu selections appearing on the touch screen display 26 by pressing stylus 23 against the portion of the touch-sensitive screen 28 overlaying the display 26.

The touch-sensitive overlay which identifies user selections made with the stylus 23, encodes the selection and is read by the processor resident within personal communication device 10.

Various functions such as increased volume, decreased volume, increased brightness, decreased brightness, etc. may be implemented by selecting the appropriate menu function from touch screen display 26 and then operating one of switches 16 or 18.

Figure 1B:
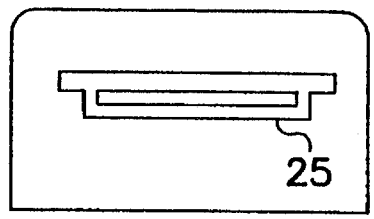
FIG. 1B is an end view of the personal communication device of FIG. 1A.

The personal communicating device of FIG. 1A also includes a standard RJ11 jack 25 as shown in FIG. 1B. The personal communication device can be directly coupled to the PSTN network through a standard telephony cable in those circumstances where cellular radio is not needed.

The protocols used in cellular radio for placing a call and answering a call are set forth in the AMPS standards. These protocol functions are carried out in a different format, suitable for RF communications different from the signalling used in the PSTN network for the same functions. The personal communication device of FIGS. 1A and 1B therefore includes interface circuitry peculiar to the cellular telephone network protocols and the PSTN network protocols so that communication through both networks is possible.

Figure 2:
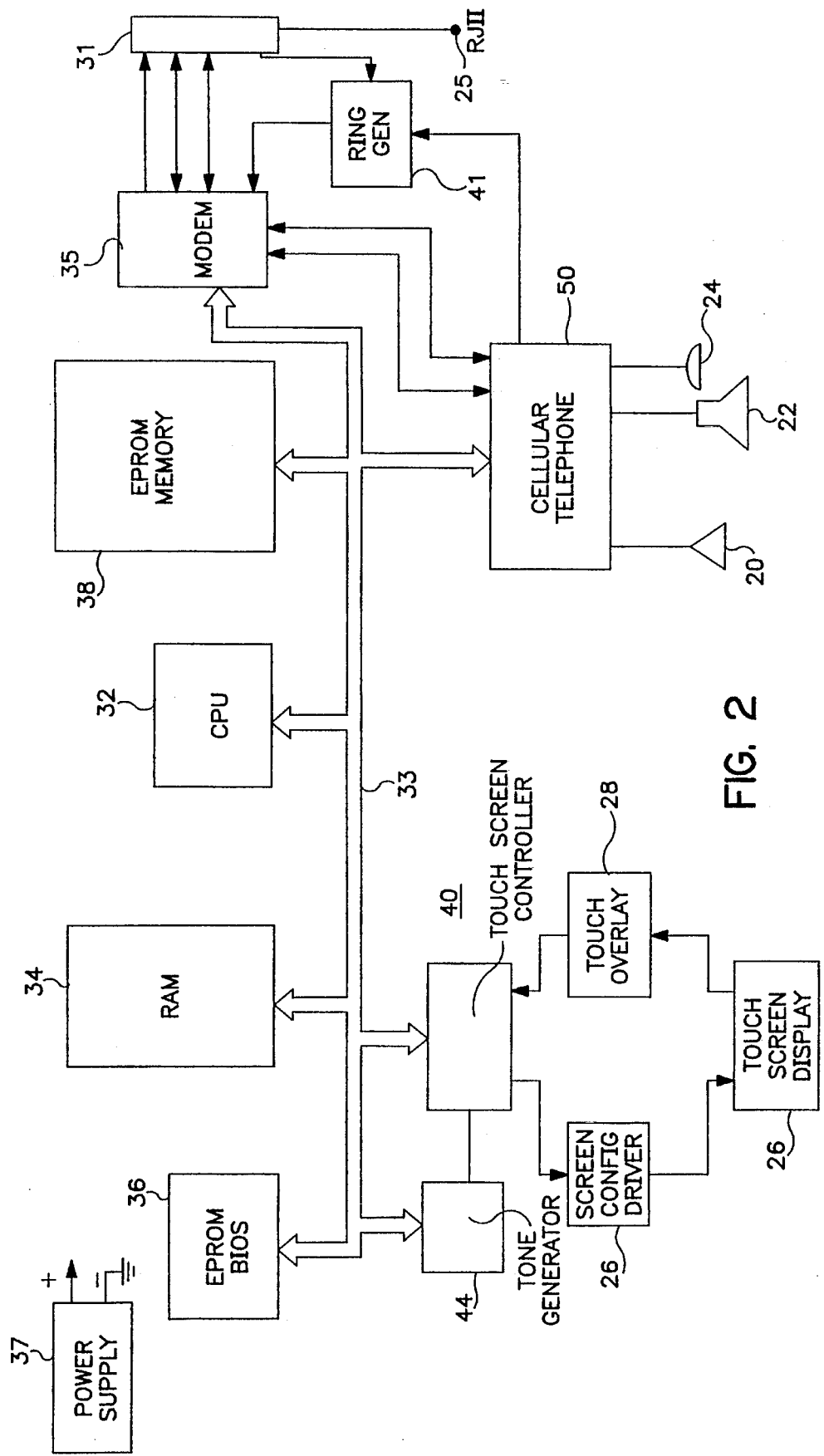
FIG. 2 is a block diagram of the device of FIG. 1 illustrating the personal communication device of the preferred embodiment of the invention.

A block diagram of the electronic circuitry architecture for the personal communication device of FIG. 1A is shown in FIG. 2. Referring now to FIG. 2, a CPU 32 is shown which controls the display of various user menus on the touch-screen display 26, as well as provides an interface between the cellular radio 50 and modem 35.

The system of FIG. 2 operates from programming information contained in EPROM 36, EPROM 38 and RAM 34. RAM 34 stores the application programs, such as the one for the address book/auto dialer, one for placing a call over the cellular radio 50, etc. The system implementation emulates that of a PC/XT class portable computer. The CPU 32 belongs to the type of Model VG 230, commercially available from VADEM, Inc., San Jose, Calif. The CPU 32 and its companion controller include an LCD controller 40, a communications port and various power and bus connections to the bus 33.

The EPROM 36 stores the basic input/output system (BIOS), as well as a self-test program. EPROM 38 contains files for providing a navigator program, the DOS and certain application programs which produce the communication and data processing functions, as well as interrupt handling for the CPU 32. Further details relating to this architecture can be found in U.S. patent application Ser. No. 08/146,342, filed Nov. 1, 1993 (Attorney Docket No. BC993-079, common assignee).

The operation of the touch-screen display 26 and touch screen overlay 28 is controlled from a touch-screen controller 40. A screen driver 48 provides the illuminating voltages and character drive signals to the touch screen display 26. The touch-sensitive screen 28 comprises an array which will sense a force applied to a particular part of the touch overlay 28 and encode the same as position information. Touch screen controller 40, via the bus 33, can provide a command identifying the location touched on the touch-sensitive screen 28 to the CPU 32. CPU 32 can then invoke the selected application program or subroutine of an application program stored in the RAM 34 for execution.

A tone generator 44 is shown which will produce an audible beep in the speaker 22 each time the screen is touched by the user using the stylus 23 and a command is successfully decoded. Thus, the user can audibly detect when his selection has been recognized.

The integrated cellular and PSTN interface is connected to the antenna 22 for transmitting and receiving to the local cellular network. The cellular telephone 50 produces a cellular ring signal indicating that an incoming call is being received by the cellular radio 50. Further, the ACC interface 39 provides a standard PSTN ring voltage from the RJ11 connector 25 tip and ring connections. A common ring generator 41 receives the ring voltage from the ACC interface 39 and cellular radio 50 and produces a single PSTN mode ring signal for modem 35.

In this way, modem 35 is initialized with a PSTN ting signal whether the incoming call is received via cellular radio 50 or over the PSTN RJ11 jack 25. The modem 35 responds to the PSTN ting signal by posting an interrupt to the CPU 32 which invokes the routine for communicating by modem. Incoming data from either the PSTN network or cellular radio 50 is received by the modem 35 as standard modem signalling tones and processed in the usual way. Further, data is output from the modem 35 to both the cellular radio 50 and interface 39 providing communication through either medium.

The capability of providing data communication through either the RJ11 jack 25 or cellular radio 50 must take into account different formats of the cellular radio network and PSTN network. When placing a call over the cellular radio network 50, the cellular radio 50 invokes the AMPS protocol application for sending dial digits via the radio interface to a base station.

The standard for placing calls on the PSTN network uses DTMF tones corresponding to called number digits. DTMF tones are also used to access equipment connected to the called party's telephone, such as banking information, voice mail messages, etc.

Various telephone equipment provides auto dialing features which will generate DTMF digits for placing a call over the PSTN network, followed by a series of DTMF digits which access equipment connected to the called station. In the cellular telephone environment, however, DTMF signalling is not used to identify the dial digits of a called party, hence transmitting a character string which includes digits of a called party's telephone number, followed by DTMF signalling digits must be delimited to prevent the cellular telephone from transmitting the PIN number as part of the dialing sequence.

The system of FIGS. 1A, 1B and 2 permits an auto dialing feature to be implemented for placing calls over the PSTN network as well as the cellular telephone network. An address/auto dialer is configured from an application program stored in RAM 34.

Figures 3A, 3B, 3C:
FIG. 3A illustrates the first screen of an address book/auto dialer feature of the personal communication device of FIG. 1.
FIG. 3B is a second screen associated with the address book/auto dialer of the personal communication device of FIGS. 1A and 1B.
FIG. 3C illustrates the third screen of the address book/ auto dialer of the personal communication device of FIGS. 1A and 1B.

Among the menu selections presented to the user is an icon identified as ADDRESS BOOK 29 on the face of the touch screen display 26. When the icon 29 is selected using the stylus 23, a full screen such as shown in FIG. 3A appears on the touch screen display 26. The display shows a series of file folder tabs labelled A through Z. By selecting a tab of FIG. 3A, using the stylus 23, a second screen, FIG. 3B, is presented. This would include all the names as well as a telephone number, not visible but stored in a memory location linked to the particular displayed name.

An icon presented with FIG. 3B, labeled NEW ENTRY, permits the user to enter yet additional names in this particular page of the address book. When the new entry icon is selected with stylus 23, a screen shown as FIG. 3C is illustrated. The user can then enter a new entry in the address book including phone number. The phone number is entered as a series of digits including any particular access codes, area codes, seven digit phone number, followed by pauses and PIN number information. Thus, the user could program his own office telephone number, using the screen of FIG. 3C, as well as any access code or personal identification number to reach a voice mail box, bank account information, or other personal information requiring an access code.

Figure 3D:
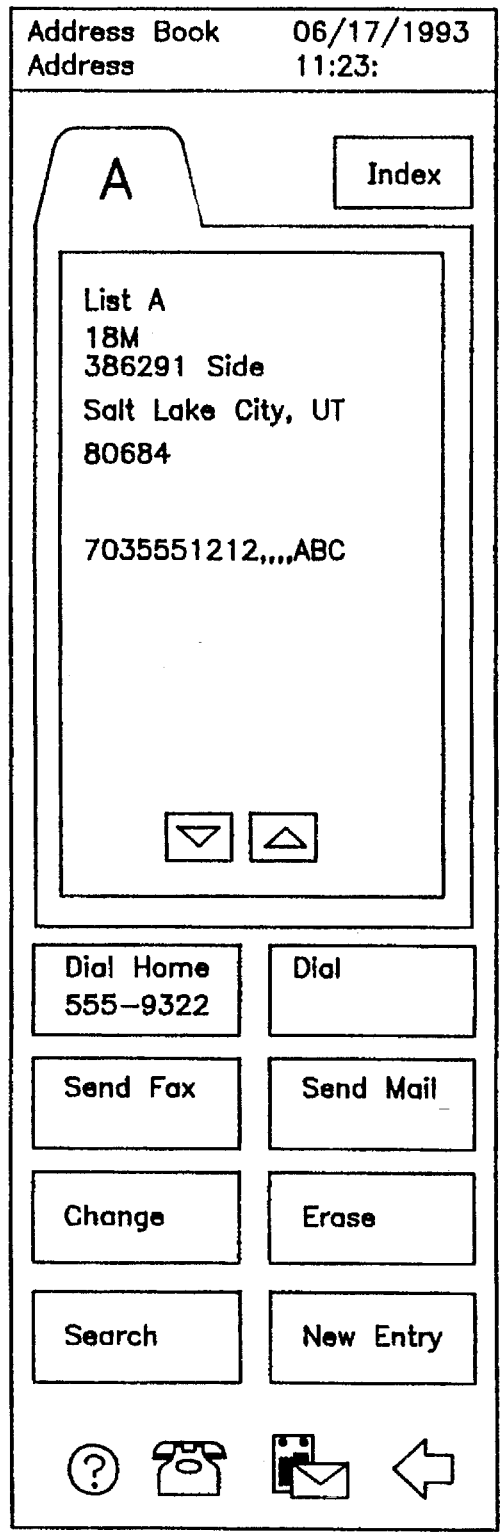
FIG. 3D illustrates the screen presented to the user when using the address book/auto dialer to place a telephone call.

FIG. 3D illustrates the screen presented to the user when placing a call using a previously entered telephone number. The telephone number may include a set of dialing digits and an access code.

A typical character string representing a telephone number and access code entry may look as follows:

703 555 1212 , , , A B C

With the foregoing character string in a conventional DTMF dialing system, all digits would be produced as DTMF tones corresponding to each digit. Commas would be interpreted as a pause of a finite length. As is known to users of telephone accessed equipment, a delay time is necessary before inputting access codes to permit the called station to go off hook and connect to a DTMF response unit. The commas appearing in the character string will provide the required delay determined by the user's experience.

When using the foregoing auto dialing feature in a cellular telephone environment, problems result because the cellular telephone does not use, per se, DTMF tone signalling. Thus, the entire character string such as shown above, would be treated as dialed digits and not as DTMF tones.

The foregoing feature address book/auto dialer feature can be implemented in a cellular telephone by an application program which will process the character string and delimit the dialed digits from any following access code. In accordance with the preferred embodiment, the user inserts a delimiting character which may be a comma between the dial digits and the access code. A null character such as # is inserted at the end of the character string.

Figure 4:
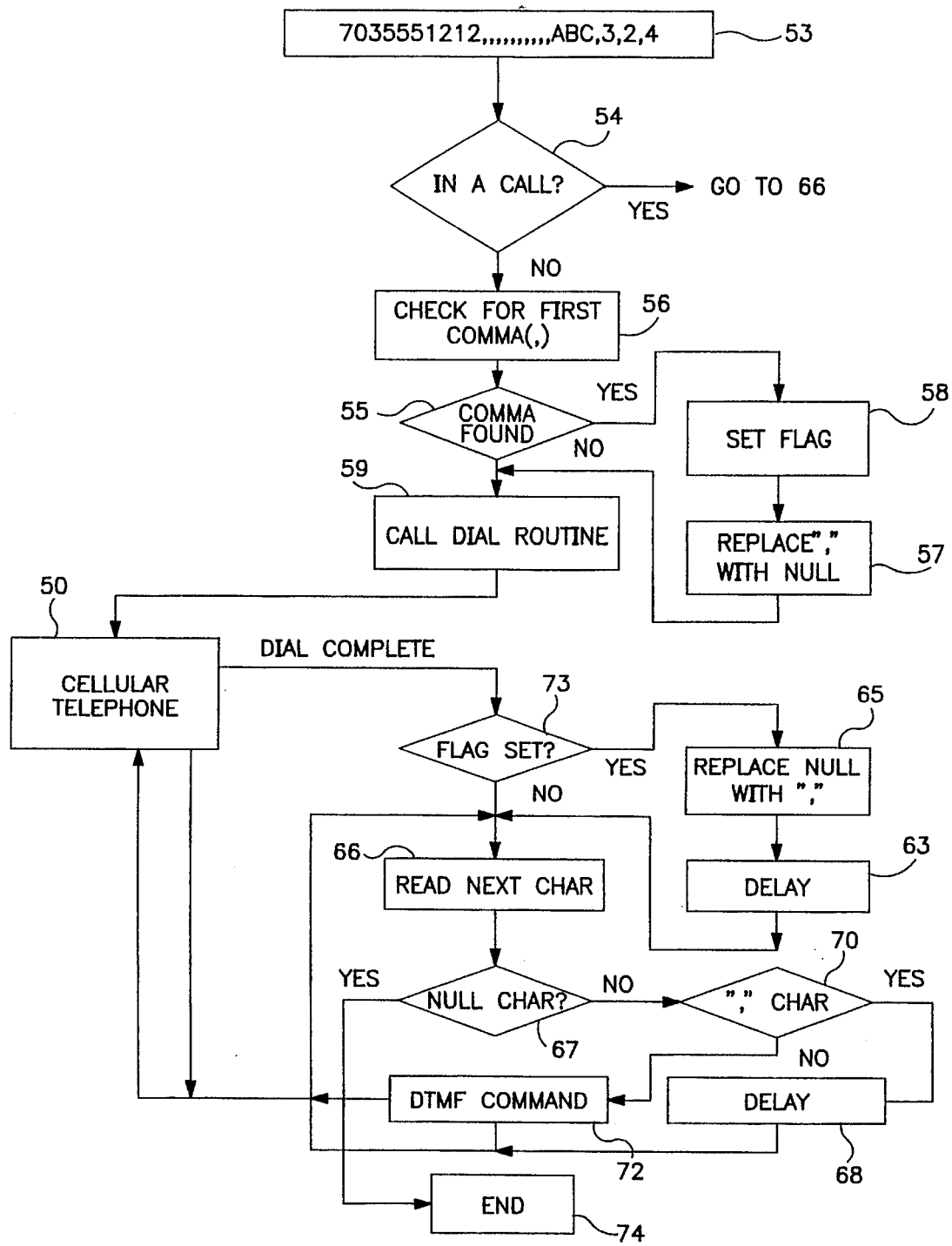
FIG. 4 is a flow chart of the routine executed by the processor of FIGS. 1A and 1B for autodialing a called number from a character string which includes DTMF signalling characters.

An application program executing the functions of FIG. 4 may be invoked when the user places a call, via the cellular network from an entry from the address book of FIG. 3D which includes a DTMF encoded access code.

Referring now to FIG. 4, there is shown the processing of a character string 53. A first decision block 54 determines whether or not a call has already been placed. If so, each of the digits contained within the string 53 are processed in step 66 as DTMF characters.

Assuming that the character string 53 includes both dialing digits for establishing a telephone connection over the cellular network and DTMF digits, the process continues to step 56. The program will count, left to right, the digits of the character string 53 and determine whether there is a first comma appearing therein. If so, decision block 55 will set a flag in step 58, and replace the comma in step 57 with a null character. The null character will delimit where DTMF signalling digits begin and dial digits end.

Having so delimited the character string 53, a call dial routine is entered in step 59 for dialing the digits preceding the null character using cellular telephone 50.

Once the dialing is completed, decision block 73 determines whether there was a flag set in step 58, indicating the presence of a comma. If so, step 65 replaces the null character with the original comma. After a delay imposed by 69, the remaining characters are processed as DTMF characters.

Step 66 reads the next character following the first comma, and if it is not a second null character as determined in 67, it is checked again in decision block 70 to determine whether a comma is present. If the read character is a comma, a delay is imposed in step 68 before returning to step 66 to read the next character. When a subsequent character is detected which is not a comma, as determined in decision block 70, a DTMF command is issued in step 72 to transmit the character as a DTMF tone over the cellular telephone.

The reading of characters in the string continues until a null character is reached in step 67 and which indicates the end of the string 11.

Thus, the foregoing routine executed by the CPU 32 will correctly delimit the dial digits from DTMF tones while treating commas during DTMF signalling as a delay in the process for dialing. Thus, users may insert commas when creating a character string 53 to provide sufficient time for the answering telephone equipment to go off hook to connect to DTMF recognition equipment.

Thus, it is clear that the personal communications device of FIGS. 1A, 1B and 2 is capable of providing DTMF signalling in the same character string even though communications are routed by cellular telephone communications or standard telephone line modem communication. Those skilled in the art will recognize yet other embodiments of the invention described more particularly by the claims which follow.

What is claimed is:

1. In a radio telephone system, an apparatus for transmitting a data string representing DTMF tones which may include a preceding series of dialing digits followed by a predefined delimiter comprising:

a radio telephone having a computer interface connected to receive commands from a data bus; a random access memory for storing a character string;

a data processor connected by said bus and to said random access memory and to said radio telephone, said data processor being programmed to create logic means comprising:

phone busy means for detecting whether said radio telephone is engaged in a telephone call;

means, responsive to said phone busy means indicating an active call, for reading said character string and for sending commands over said data bus to cause said radio telephone to send DTMF tones corresponding to the entire character except for the delimiter character which is interpreted as a pause;

means, responsive to said phone busy means indicating no active call, for reading each character of said stored character string and for identifying each delimiter character in said character string, the first of said characters delimiting the end of dialing digits and the beginning of DTMF digits;

means for sending a command over said bus to said radio telephone to place a call to a party identified by said dialing digits;, if any, and, means for sending a subsequent command to said radio telephone to transmit each character following the first said delimiter character as DTMF tones except delimiter characters.

2. The radio telephone apparatus of claim 1, wherein the delimiter character is a comma and each comma following said dialing digits represents a time delay interval between each command to transmit a character as a DTMF tone.

3. The radio telephone apparatus of claim 1, further comprising the programming step of:

prior to reading each character, determining if said radio telephone is engaged in a telephone call; and, if said radio telephone is determined to be in a telephone call, sending a series of commands to said radio telephone to transmit all of said characters as DTMF digits separated by a time interval represented by each comma which is found between characters.

4. The radio telephone of claim 2, wherein the identifying means inserts each a null character in the string of characters in place of said first character to delimit the dialing digits from DTMF digits, and replaces said null character with a comma when said call has been placed.

5. The radio telephone of claim 4, wherein each comma including said replaced comma represents a time delay between each DTMF tone transmitted by said radio telephone.

6. A method of controlling a radio telephone to place a telephone call and transmit a series of DTMF digits contained in the same character string as dial digits comprising:

storing in a register a series of digits including a sequence of DTMF digits, which include dial digits separated from said DTMF digits by at least one comma;

detecting if said radio telephone is busy with an existing call;

reading each character in said register and identifying the first comma in said register as a delimiter to separate dialing digits and DTMF digits if said radio telephone is not busy and as a pause in a series of DTMF digits if said radio telephone is busy;

forming a dial command from said dialing digits, if any, and forwarding said command to a radio telephone for placing a call to a receiving device identified by said dialing digits; and, forming a DTMF command for each of said digits following said comma, and forwarding said DTMF commands to said radio telephone along with each of said following digits, whereby said radio telephone places said call and subsequently transmits said DTMF digits to said called receiving device.

7. The method according to claim 6 further comprising during the reading of each character following said first comma, delaying the transmission of said DTMF digits a delay period which is proportional to the number of said commas.

8. The method according to claim 6, further comprising the steps of: before reading each character in said string, determining whether said radio telephone is engaged in a call; and, transmitting all of said characters as DTMF digits if said radio telephone is engaged in a call, and introducing a delay between transmission of digits for each comma detected between digits.

* * * * *

UNITED STATES PATENT AND TRADEMARK OFFICE
CERTIFICATE OF CORRECTION

PATENT NO. : 5,561,705
DATED : October 1, 1996
INVENTOR(S) : Allard et al.

It is certified that error appears in the above-indentified patent and that said Letters Patent is hereby corrected as shown below:

Column 7:

In claim 1, line 31, after "except", insert --said--.
Column 8:
In claim 4, line 2, change "means inserts each" to --means each inserts--.

Signed and Sealed this

Thirty-first Day of December, 1996

Attest:

BRUCE LEHMAN

*Attesting Officer*    *Commissioner of Patents and Trademarks*